US009235894B2

(12) United States Patent
Benhimane et al.

(10) Patent No.: US 9,235,894 B2
(45) Date of Patent: Jan. 12, 2016

(54) METHOD FOR DETERMINING CORRESPONDENCES BETWEEN A FIRST AND A SECOND IMAGE, AND METHOD FOR DETERMINING THE POSE OF A CAMERA

(75) Inventors: Selim Benhimane, Munich (DE); Daniel Ulbricht, Neufahrn (DE)

(73) Assignee: Metaio GmbH, Munich (DE)

( * ) Notice: Subject to any disclaimer, the term of this patent is extended or adjusted under 35 U.S.C. 154(b) by 121 days.

(21) Appl. No.: 13/982,177

(22) PCT Filed: Jan. 27, 2011

(86) PCT No.: PCT/EP2011/051142
§ 371 (c)(1),
(2), (4) Date: Oct. 15, 2013

(87) PCT Pub. No.: WO2012/100829
PCT Pub. Date: Aug. 2, 2012

(65) Prior Publication Data
US 2014/0037140 A1 Feb. 6, 2014

(51) Int. Cl.
*G06T 7/00* (2006.01)
*G06K 9/62* (2006.01)

(52) U.S. Cl.
CPC .............. *G06T 7/004* (2013.01); *G06K 9/6211* (2013.01); *G06T 7/0044* (2013.01); *G06T 2207/30244* (2013.01)

(58) Field of Classification Search
None
See application file for complete search history.

(56) References Cited

U.S. PATENT DOCUMENTS

| 7,023,536 | B2 | 4/2006 | Zhang et al. |
| 7,038,846 | B2 | 5/2006 | Mandella |
| 7,088,440 | B2 | 8/2006 | Buermann et al. |
| 7,110,100 | B2 | 9/2006 | Buermann et al. |
| 7,113,270 | B2 | 9/2006 | Buermann et al. |
| 7,161,664 | B2 | 1/2007 | Buermann et al. |
| 7,203,384 | B2 | 4/2007 | Carl |
| 7,268,956 | B2 | 9/2007 | Mandella |
| 7,474,809 | B2 | 1/2009 | Carl et al. |

(Continued)

FOREIGN PATENT DOCUMENTS

WO   2010142897   12/2010

OTHER PUBLICATIONS

Jing et al. "An Improved Real-Time Natural Feature Tracking Algorithm for AR Application", Proceedings of the International Conference on Artificial Reality and Telexistence-Workshop, Nov. 1, 2006, pp. 119-124.

(Continued)

*Primary Examiner* — Siamak Harandi
(74) *Attorney, Agent, or Firm* — Blank Rome LLP

(57) ABSTRACT

A method for determining correspondences between a first and a second image, comprising the steps providing a first image and a second image of the real environment, defining a warping function between the first and second image, determining the parameters of the warping function between the first image and the second image by means of an image registration method, determining a third image by applying the warping function with the determined parameters to the first image, determining a matching result by matching the third image and the second image, and determining correspondences between the first and the second image using the matching result and the warping function with the determined parameters. The method may be used in a keyframe based method for determining the pose of a camera based on the determined correspondences.

22 Claims, 6 Drawing Sheets

(56) References Cited

U.S. PATENT DOCUMENTS

| | | | |
|---|---|---|---|
| 7,729,515 | B2 | 6/2010 | Mandella et al. |
| 7,826,641 | B2 | 11/2010 | Mandella et al. |
| 7,961,909 | B2 | 6/2011 | Mandella et al. |
| 2005/0168437 | A1 | 8/2005 | Carl et al. |
| 2008/0170126 | A1* | 7/2008 | Tico et al. .................. 348/208.6 |
| 2011/0227915 | A1 | 9/2011 | Mandella et al. |
| 2012/0038549 | A1 | 2/2012 | Mandella et al. |
| 2013/0194418 | A1 | 8/2013 | Gonzalez-Banos et al. |

OTHER PUBLICATIONS

Clark et al. "Perspective Correction for Improved Visual Registration Using Natural Features", Image and Vision Computing New Zealand, Nov. 26, 2008, pp. 1-6.

Christophe et al. "From Rendering to Tracking Point-Based 3d Models", Image and Vision Computing, vol. 28, No. 9, Sep. 1, 2010, pp. 1386-1395.

Guan et al. "Fast Scene Recognition and Camera Relocalisation for Wide Area Augmented Reality Systems", Sensors, col. 10, No. 6, Jan. 1, 2010, pp. 6017-6043.

Platonov et al. "A Mobile Markerless AR System for Maintenance and Repair", Mixed and Augmented Reality, 2006, pp. 105-108.

DeMenthon et al. "Pose from Orthography and Scaling with Iterations", 1995.

Klein et al. "Parallel Tracking and Mapping for Small AR Workspaces", Mixed and Augmented Reality, 2007.

Lepetit et al. "Fully Automated and Stable Registration for Augmented Reality Applications", Mixed and Augmented Reality, Mar. 2003.

Malis, "An Efficient Unified Approach to Direct Visual Tracking of Rigid and Deformable Surfaces", Intelligent Robots and Systems, 2007.

Silveira et al. "Real-Time Visual Tracking under Arbitrary Illumination Changes", Computer Vision and Pattern Recognition, 2007.

Lucas et al. "An Iterative Image Registration Technique with Application to Stereo Vision", JCAI, pp. 674-679, 1981.

Baker et al. "Equivalence and Efficiency of Image Alignment Algorithms", IEEE CVPR, pp. 1090-1097, 2001.

Benhimane et al. "Real-Time Image-Based Tracking of Planes using Efficient Second-Order Minimization", IEEE/RSJ, pp. 943-948, 2004.

\* cited by examiner

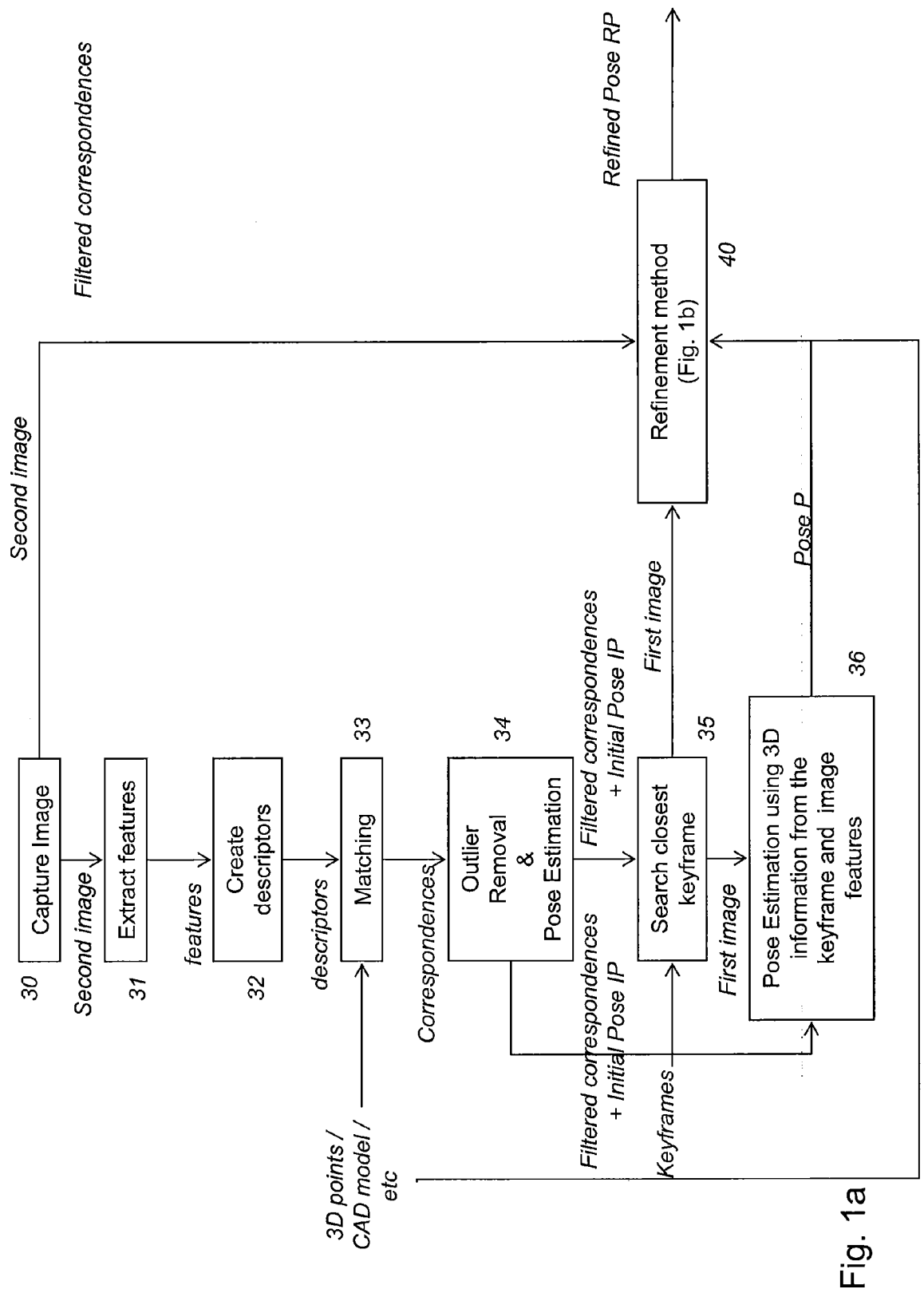

METHOD FOR DETERMINING CORRESPONDENCES BETWEEN A FIRST AND A SECOND IMAGE, AND METHOD FOR DETERMINING THE POSE OF A CAMERA

This application is entitled to the benefit of, and incorporates by reference essential subject matter disclosed in PCT Application No. PCT/EP2011/051142 filed on Jan. 27, 2011.

BACKGROUND OF THE INVENTION

1. Technical Field

The invention is related to a method for determining correspondences between a first and a second image, for example for use in an optical tracking and initialization process, such as an optical keyframe supported tracking and initialization process. Moreover, the present invention relates to a method for determining the pose of a camera using such method, and to a computer program product comprising software code sections for implementing the method.

2. Background Information

Keyframe-based 3D Tracking is often required in many computer vision applications such as Augmented Reality (AR) applications. In this kind of tracking systems the camera position and orientation are estimated out of 2D-3D correspondences supported through so-called keyframes to allow automatic initialization and re-initialization in case of a lost tracking. This 2D-3D correspondences are often established using CAD models like described in: Juri Platonov, Hauke Heibel, Peter Meier and Bert Grollmann, "A mobile markerless AR system for maintenance and repair", In: proceeding of the 5$^{th}$ IEEE and ACM International Symposium on Mixed and Augmented Reality.

Keyframes are frames with pre-extracted feature descriptors, and a reliable set of 2D-3D correspondences can therefore be registered into a common coordinate system. By matching extracted feature descriptors of a current camera image (a current image of a real environment taken by a camera) with the available 3D points' feature descriptors of a keyframe, 2D-3D correspondences in the current image can be established and a rough camera pose be estimated. Searching the closest keyframe to the estimated pose and back-projecting the stored 3D points into the current image increases the number of correspondences if the projected points are comparable to the stored 2D appearances in the keyframe. By performing 2D-3D pose estimation, a more accurate camera pose can now be computed to initialize tracking algorithms like KLT or POSIT (as disclosed in: "Pose from Orthography and Scaling with Iterations"—DeMenthon & Davis, 1995).

Recent publications like G. Klein and D. Murray: "Parallel Tracking and Mapping for Small AR Workspaces", in: Proceeding of the International Symposium on Mixed and Augmented Reality, 2007, have shown the advantage of keyframe based (re)initialization methods. Klein compares a downscaled version of the current image with downscaled keyframes and chooses the image with the best intensity-based similarity as the closest keyframe. Frames from the tracking stage are added as keyframes into the system if many new feature points can be found and the baseline to all the other keyframes is large enough.

When doing 3D markerless tracking a standard approach can be described using the following steps. In this regard, FIG. 4 shows a flow diagram of an exemplary process for keyframe generation:

In Steps 1 and 2, once a set of digital images (one or more images) are acquired, features are extracted from a set of these "reference" digital images and stored. The features can be points, a set of points (lines, segments, regions in the image or simply a group if pixels), etc.

In Step 3, descriptors (or classifiers) may be computed for every extracted feature and stored. These descriptors may be called "reference" descriptors.

In Step 4, the extracted 2D reference features get registered against 3D points by using manual, semi-automatically or full automatically registration methods using online reconstruction methods like SLAM or simply by a known CAD model.

In Step 5, the extracted 2D features and assigned 3D points are getting stored with the digital image in a structure. This structure is called keyframe.

According to FIG. 5, a standard keyframe supported method for initializing and tracking is described which comprises the following steps:

In Step 10, one or more current images are captured by a camera, the pose of which shall be determined or estimated.

In Step 11, for every current image captured, features of the same types used in the keyframes are extracted. These features maybe called "current features".

In Step 12, descriptors (or classifiers) may be computed for every current feature extracted and stored. These descriptors may be referenced as "current descriptors".

In Step 13, the current features are matched with the reference features using the reference and current descriptors. If the descriptors are close in terms of a certain similarity measure, they are matched. For example the dot product or Euclidean distance of vector representations can be used as similarity measurement.

In Step 14, given a model of the target, an outlier rejection algorithm is performed. The outlier rejection algorithm may be generally based on a robust pose estimation like RANSAC or PROSAC.

In Step 15, the keyframe providing the highest number of verified matches is selected to be the closest keyframe.

In Step 16, using the 2D coordinates from the current frame and the 3D coordinates indirectly known through the 2D-(2D-3D) matching an initial camera pose can be computed using, e.g., common linear pose estimation algorithms like DLT refined by classical non-linear optimization methods (Gauss-Newton, Levenberg-Marquard).

In Step 17, to improve this computed first guess of the camera pose, not yet matched 3D points from the keyframe may be projected into the current camera image using the computed pose.

In Step 18, the descriptors of all projected points (local patch around the point) get compared against the local descriptors of known 2D points in the current frame (current image). Again based on a similarity measurement method these points are handled as matched or not. Commonly a local 2D tracking like KLT is performed to deal with small displacements.

In Step 19, using all new and before known 2D-3D matches the pose estimation step is again performed to compute a more precise and reliable pose of the camera (Refined Pose RP).

As limitations of the standard approaches, the 3D points projected into the current camera image often get rejected because the displacement is often too large for common 2D tracking algorithms like KLT which is only able to deal with pure translations. Due to the fact that small rotations can be approximated as translations very small rotations can be handled but the algorithm will fail in case of a bigger rotation. Also the descriptors generally handle in-plane rotation, scale and in the best case affine transformations but do not handle perspective distortions, this makes the descriptor-based approaches vulnerable when such distortions are present in the image.

An approach for improving the matching process is described in: Vincent Lepetit, Luca Vacchetti, Daniel Thalmann and Pascal Fua: "Fully Automated and Stable Registration for Augmented Reality Applications", Proc. Of the Second IEEE and ACM International Symposium on Mixed and Augmented Reality (ISMAR2003), where the authors are locally approximating the object surface around the interest points by planes to synthetically re-render all patches using the coarse estimated camera pose. All re-rendered patches are used to create a keyframe which is closer to the current frame and therefore allows increasing the number of total matches. To speed up the computation all transformations are approximated to be homographies extracted from the projection matrices given the intrinsic parameters of the used camera.

This approach has the disadvantage that this approximation can only be done by knowing the camera model and an initial guess of the pose which makes the approach not usable in case the camera parameters are unknown and/or when, e.g., the camera intrinsic parameters are planned to be estimated on-line.

Therefore, it would be beneficial to provide a method for determining correspondences between a first and a second image, which is independent from the used camera model and not strongly dependent on the initial guess of the pose.

SUMMARY OF THE INVENTION

According to one aspect of the invention, there is provided a method for determining correspondences between a first and a second image, the method comprising the steps of:

a) providing a first image and a second image of the real environment, b) defining a warping function between the first and second image, c) determining the parameters of the warping function between the first image and the second image by means of an image registration method, d) determining a third image by applying the warping function with the determined parameters to the first image, e) determining a matching result by matching the third image and the second image, and f) determining correspondences between the first and the second image using the matching result and the warping function with the determined parameters.

In a possible implementation of the method, with using these matches, a more accurate pose of the camera can be computed. Also this approach allows a better initialization of 3D Tracking Systems if the first image (e.g., a keyframe image) is far from the second image (e.g., a current image). Further, the method is independent from the used camera model and not strongly dependent on the initial guess of the pose due to the fact that an image registration method is used.

According to an example, the first image may be a reference image (keyframe) with pre-extracted feature descriptors and a reliable set of 2D-3D correspondences, which may be generated as described above with reference to FIG. 4. The second image may be a current image of a real environment which is captured by a camera in a current situation. By defining a warping function between the first and second image and applying it to the first image for determining the third image, conditions or changes of the real environment or camera motion between capturing the first and second images may be assumed and reflected in the warping function, which may facilitate the matching of images and the determination of correspondences between the first and a second image.

For example, for determining the correspondences, features are extracted from the third image (e.g., warped keyframe) and matched against features of the second image (current image). The correspondences between the first image (keyframe) and the second image are determined using the matching result and the warping function with the determined parameters. More particularly, the matches between the second image and the third image get unwarped using an inverse parameter set of the warping function to establish matches between the second image and the first image.

In comparison to the previous approach described in Lepetit et al.: "Fully Automated and Stable Registration for Augmented Reality Applications", as mentioned above, the proposed method of Lepetit et al. is decomposing a computed projection matrix using a known 3D plane corresponding to a local feature in the image, a known previous pose (R, t) and a known camera intrinsic into a homography used for warp patches. The approach according to the present invention, however, is appropriate to directly compute the homography by only taking the current image and the keyframe image into account and is therefore independent from the camera intrinsic and the previous computed pose.

According to an embodiment of the invention, the definition of the warping function is based on an assumption about the geometry of the real environment. For example, the geometry of the real environment is assumed to be planar. In this embodiment, as a condition reflected in the warping function it may be assumed that the camera is moved in a way between the situations when capturing the first and second images which allows to neglect depth information when finding correspondences between the images.

According to another embodiment, the definition of the warping function is based on changes in the real environment between capturing the first image and capturing the second image. For example, a warping function may be used based on techniques for tracking deformable surfaces like described in: Ezio Malis, "An efficient unified approach to direct visual tracking of rigid and deformable surfaces", Intelligent Robots and Systems, IROS 2007.

For example, the assumption about the geometry of the real environment and/or the changes in the real environment between capturing the first image and the second image may be acquired from an environment model, a three-dimensional reconstruction method, a time-of-flight camera, stereovision and/or a structured-light-based approach where the light may be visible or infra-red (e.g. Microsoft Kinect device).

According to another embodiment of the invention, the definition of the warping function is based on an assumed camera motion between capturing the first image and capturing the second image. For example a linear translation between capturing the first image and capturing the second image can be assumed as a camera motion.

According to another embodiment of the invention, the definition of the warping function is based on illumination changes in the real environment or in the image between the first image and the second image. For example, a warping function may be used based on techniques for tracking surfaces under varying lighting conditions like described in: Geraldo Silveira and Ezio Malis, "Real-time Visual Tracking under Arbitrary Illumination Changes", Computer Vision and Pattern Recognition, 2007, CVPR '07.

In an embodiment of the invention, the image registration method may be selected according to the definition of the warping function.

In a further embodiment, the image registration method is based on an iterative minimization process, wherein a first set of pixels in the first image is compared with a computed set of pixels in the second image and the computed set of pixels in the second image used for the comparison varies at each iteration. For example, the comparison in the image registration method is based on image intensity differences.

According to an embodiment, an initial estimate of the parameters of the warping function may be provided to the iterative minimization process. For example, the initial estimate of the parameters of the warping function is determined using an estimate of camera motion between capturing the first image and capturing the second image.

According to an embodiment of the invention, step e) of the method is further comprising the steps of extracting features from the third image, extracting features from the second image, and determining the matching result by matching the extracted features from the third and the second images. For example, the method further comprises the step of providing initial correspondences between the first image and the second image, wherein the matching result is determined only for the extracted features that are not present in the initial correspondences.

Particularly, the initial correspondences may be determined using an image matching method. For example a state of the art method may be used as described above with reference to FIG. 5. Also, initial correspondences may be determined manually.

According to another aspect of the invention, there is provided a method for determining the pose of a camera, comprising the steps of:

a) providing at least one reference image and a reference pose of the camera in a common coordinate system while capturing the at least one reference image, b) capturing a current image, c) determining correspondences between the current image and the at least one reference image according to the method of one of the preceding claims, wherein the first image is set to be the reference image or the current image, and the second image is set to be the current image or the reference image, respectively, and d) determining the pose of the camera based on the determined correspondences.

According to an embodiment, step b) of this aspect is further comprising the step of providing an initial estimate of the current pose of the camera in the common coordinate system while capturing the current image, and in step c) the current image is matched with at least one reference image selected from a set of reference images, wherein the selection is based on the distance of the reference pose to the estimate of the current pose.

For example, the initial estimate of the pose of the camera is acquired by using an optical tracking method, inertial sensor information and/or stereo vision.

In the context of the invention, an inertial sensor may, e.g. continuously, provide sensor information including the position and/or orientation of an object or device with regard to the environment, by using any combination of the following: magnetometer (e.g. a compass), motion sensor/rotation sensor (accelerometers/gyroscopes), gravity sensor, and other sensors providing such information.

According to another aspect of the invention, there is provided a computer program product adapted to be loaded into the internal memory of a digital computer and comprising software code sections by means of which the methods as described above may be performed when said product is running on said computer.

BRIEF DESCRIPTION OF THE DRAWINGS

The invention will now be explained with reference to the following description of exemplary embodiments together with accompanying drawings, in which:

FIG. 1 shows a flow diagram of an embodiment of the invention, wherein FIG. 1a shows an overall process of determining a pose of a camera and FIG. 1b shows a refinement method for determining the pose.

DETAILED DESCRIPTION OF THE INVENTION

With reference to FIG. 1, an embodiment of a method according to aspects of the invention will be explained in more detail. The skilled person will understand that the following description is only an example of a possible implementation of aspects of the method according to the invention, and that the method or steps thereof may also be used in any other fields or applications where correspondences between a first and a second image shall be determined.

In the embodiment of FIG. 1, a keyframe supported method for initializing and tracking is described which implements aspects of the present invention. In this embodiment, the described method serves for determining the pose of a camera, which captures one or more images of a real environment, in relation to an object of the real environment. In general, at least one reference image (e.g., keyframe image) is provided which includes data of a reference pose of the camera in a common coordinate system while capturing the reference image. This reference image serves as a basis for determining the pose of the camera while capturing a current image of the real environment. For determining the pose of the camera, correspondences between the current image and the at least one reference image are determined according to aspects of the present invention.

Figure 4:
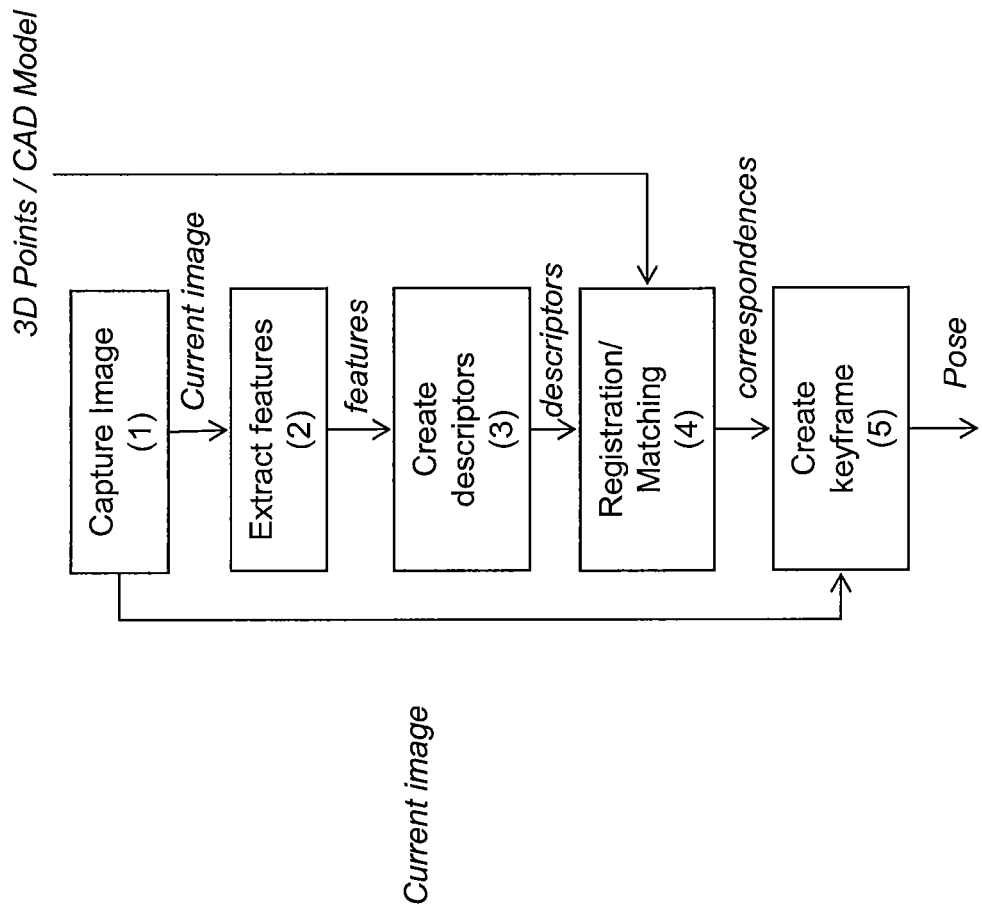
FIG. 4 shows a flow diagram of a standard process for keyframe generation.
Figure 5:
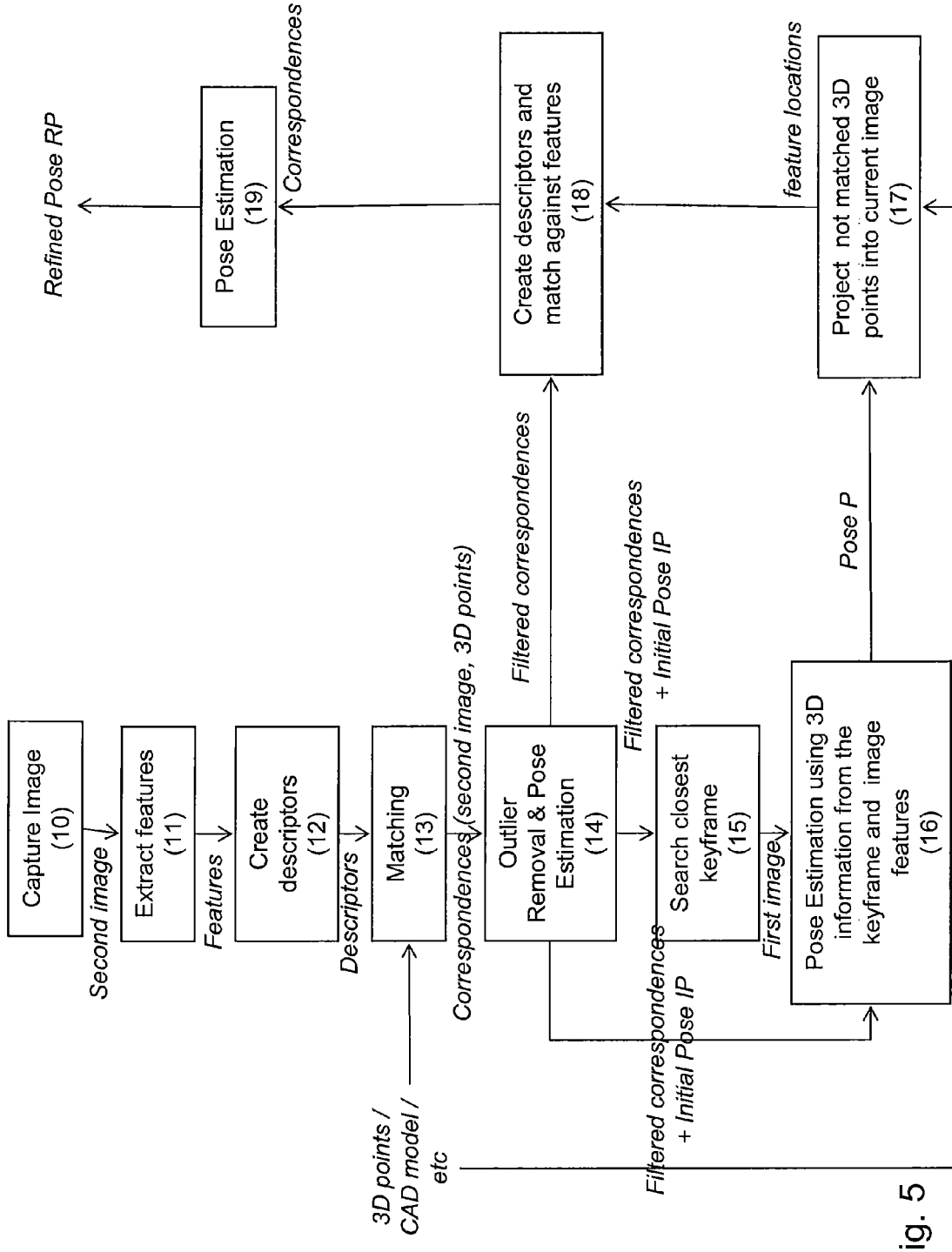
FIG. 5 shows a flow diagram of a standard process for initialization and tracking based on use of keyframes.

More specifically, in Steps 30 to 36 a process for determining of an initial estimate of a camera pose is performed which substantially corresponds to the initialization process as described above with respect to parts of FIG. 5. It uses reference images or keyframes having reference features and reference descriptors of the type as described above with reference to FIG. 4.

Particularly, in Step 30, one or more current images are captured by a camera, the pose of which shall be determined and tracked. In Step 31, for every current image captured, features of the same types as used in the reference images are extracted. These features are called "current features". In Step 32, descriptors (or classifiers) are computed for every current feature extracted and stored. These descriptors are referenced as "current descriptors". In Step 33, the current features are matched with the reference features using the reference and current descriptors. If the descriptors are close in terms of a certain similarity measure, they are matched. For example the dot product or Euclidean distance of vector representations can be used as similarity measurement. In Step 34, given a model of the target, an outlier rejection algorithm is performed. The outlier rejection algorithm may, for example, be based on a robust pose estimation like RANSAC or PROSAC. As an output in step 34 filtered correspondences are provided which are the remaining correspondences after the outlier rejection or removal. The filtered correspondences are also provided as an input to the process according to step 40, as explained in more detail below with reference to FIG. 1b. In Step 35, the keyframe providing the highest number of verified matches is selected to be the closest keyframe. In Step 36, using the 2D coordinates of image features from the current image and the 3D coordinates indirectly known through the 2D-(2D-3D) matching, an initial camera pose P can be computed using, e.g., common linear pose estimation algorithms like DLT refined by classical non-linear optimization methods (Gauss-Newton, Levenberg-Marquard). In Step 40, a refined camera pose RP is determined according to a process as set out in FIG. 1b.

Figure 1B:
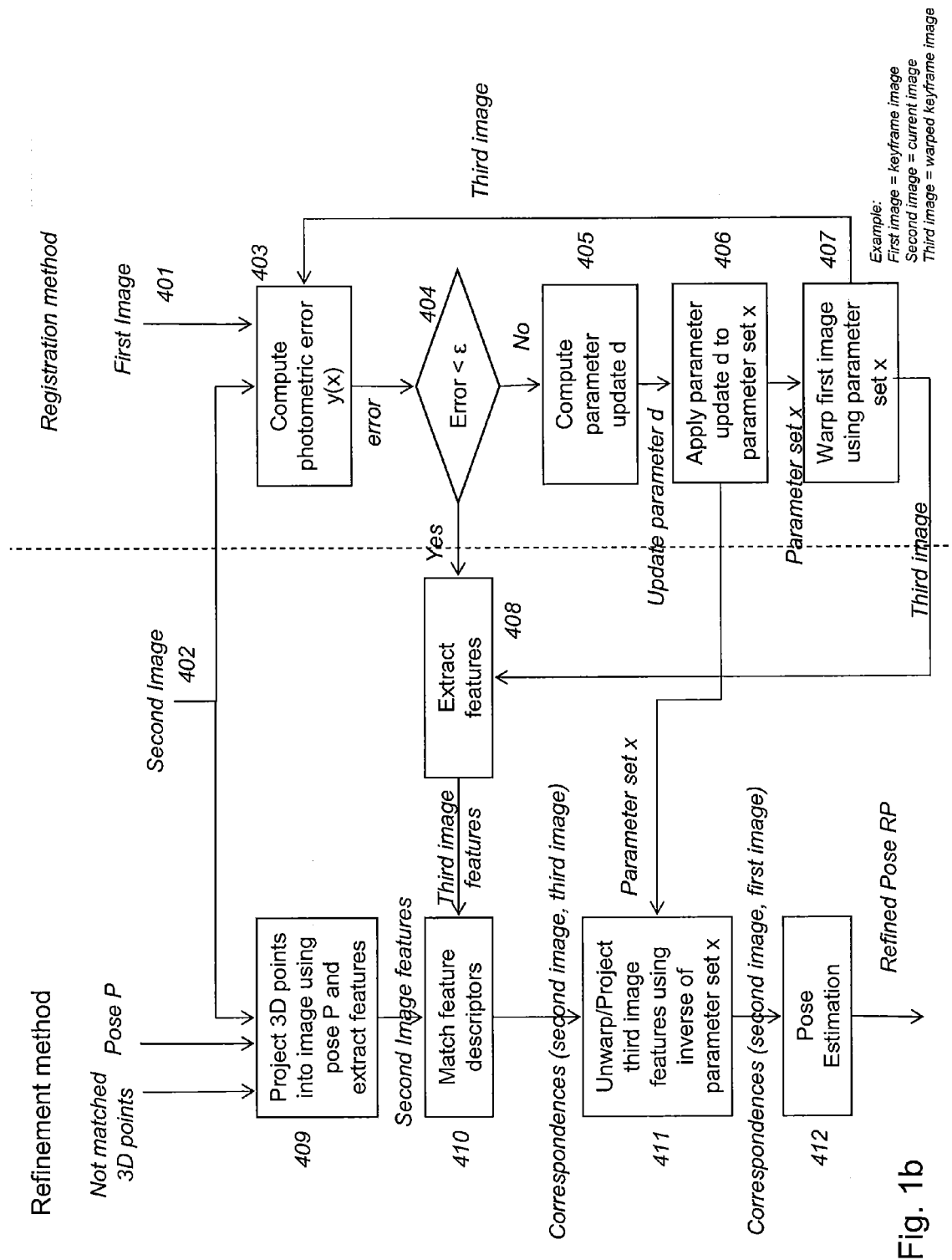

In FIG. 1b, an embodiment of a method for determining correspondences between a first and a second image is described which may serve to determine a refined pose of a camera, and may be used in Step 40 of the process according to FIG. 1a. In the present implementation and context of the process according to FIG. 1a, the first image as referred to below is set to be the reference image (e.g., closest keyframe) and the second image as referred to below is set to be the current image captured by the camera. However, according to another embodiment, the first image may be set to be the current image captured by the camera and the second image may be set to be the reference image (e.g., closest keyframe).

Particularly, the approach shown in FIG. 1b is directly computing a transformation using an efficient image alignment/registration method, as depicted on the right hand side of FIG. 1b. Based on, for example, the image difference between the first image provided in Step 401 and the second image provided in Step 402 which gives a photometric error y(x) (Step 403), a parameter update d is computed (Step 405) in case the error is larger than a specified threshold ϵ (decision made in Step 404). The parameter set x (which is explained in more detail below) gets updated with the computed parameter update d (Step 406) and a warped keyframe is generated using the assumed warping method and the parameter set x (Step 407). Iteratively repeating these steps, the photometric error y(x) gets minimized. If the error is below the given threshold ϵ, features get extracted from the warped keyframe (Step 408) and matched against features which are extracted from the second image (Step 410), wherein in this embodiment additionally 3D points are projected into the second image using the pose P (Step 409). For example, the method further comprises the step of providing initial correspondences between the first image and the second image, wherein the matching result of Step 410 is determined only for the extracted features that are not present in the initial correspondences. The matches between the second image and warped first image (third image) get unwarped using the inverse parameter set x to establish matches between the second image and the first image (Step 411). With using these matches, a more accurate pose RP can be computed (Step 412). Also this approach allows a better initialization of 3D Tracking Systems if the first image (e.g., keyframe) is far from the current image.

More particularly, in Step 401, with the first image (keyframe image) a parameter set x is provided comprising an optional initial estimate of the reference pose (i.e. the pose of the camera when capturing the keyframe image). Particularly, in a preferred embodiment, the initial estimate of parameter set x is including the three-dimensional translation and the three dimensional rotation in the common coordinate system between the pose of the camera when capturing the keyframe image and the pose of the camera when capturing the current image. The initial estimate is optional when the camera is assumed to be static when capturing the first image and the second (or current) image. The initial values of the rotation and translation would then be zero. In a preferred embodiment, the initial estimate can be provided by e.g. an inertial sensor or an external tracking system.

In step 403, a first set of pixels in the first image (keyframe image) is compared with a computed set of pixels in the second image (current image), the computed set of pixels being indicative of a part of the second image. In this way, the photometric error y(x) may be computed. In the following iterative minimization process according to steps 403-407, a first set of pixels in the first image is compared with a computed set of pixels in the second image, wherein the computed set of pixels in the second image used for the comparison varies at each iteration. Particularly, the photometric error y(x) is computed using the data of the second image and the first image. This error is used in the cost function phi(d) of a non-linear optimization that searches for an update d of the parameter set x. Regularization can optionally be integrated into phi(d).

According to Step 405, a parameter update d of the parameter set x is computed from the photometric error y(x) and applied to the parameter set x in Step 406, and a warped keyframe is generated in Step 407 using the assumed warping method and the parameter set x.

For more details about how to compute the update given the photometric error, one could use any of the following references:

B. Lucas and T. Kanade, "An iterative image registration technique with application to stereo vision," in JCAI, p. 674-679, 1981.

S. Baker and I. Matthews, "Equivalence and efficiency of image alignment algorithms", in IEEE CVPR, p. 1090-1097, 2001.

S. Benhimane and E. Malis, "Real-time image-based tracking of planes using Efficient Second-order Minimization", p. 943-948, in IEEE/RSJ IROS 2004.

The steps 403-407 are iteratively repeated wherein the photometric error y(x) gets minimized. If the error is below the given threshold ϵ, features are extracted from the warped keyframe (Step 408).

For example, the definition of the warping function in Step 407 is based on an assumption about the geometry of the real environment. For example, the geometry of the real environment is assumed to be planar. Further, the definition of the warping function may be based on changes in the real environment between capturing the first image and capturing the second image. For example, the assumption about the geometry of the real environment and/or the changes in the real environment between capturing the first image and the second image may be acquired from an environment model, a three-dimensional reconstruction method, a time-of-flight camera, stereovision and/or a structured-light-based approach where the light is visible or infra-red (e.g. Microsoft Kinect device).

Moreover, the definition of the warping function may be based on an assumed camera motion between capturing the first image and capturing the second image. For example a linear translation between capturing the first image and capturing the second image can be assumed as a camera motion. Further, the definition of the warping function may be based on illumination changes in the real environment or in the image between the first image and the second image. For example, a warping function may be used based on techniques for tracking surfaces under varying lighting conditions.

For example, the image registration method can be selected according to the definition of the warping function. In a further embodiment, the image registration method may be based on an iterative minimization process, as set out above.

For example, the comparison in the image registration method is based on image intensity differences.

Figure 2:
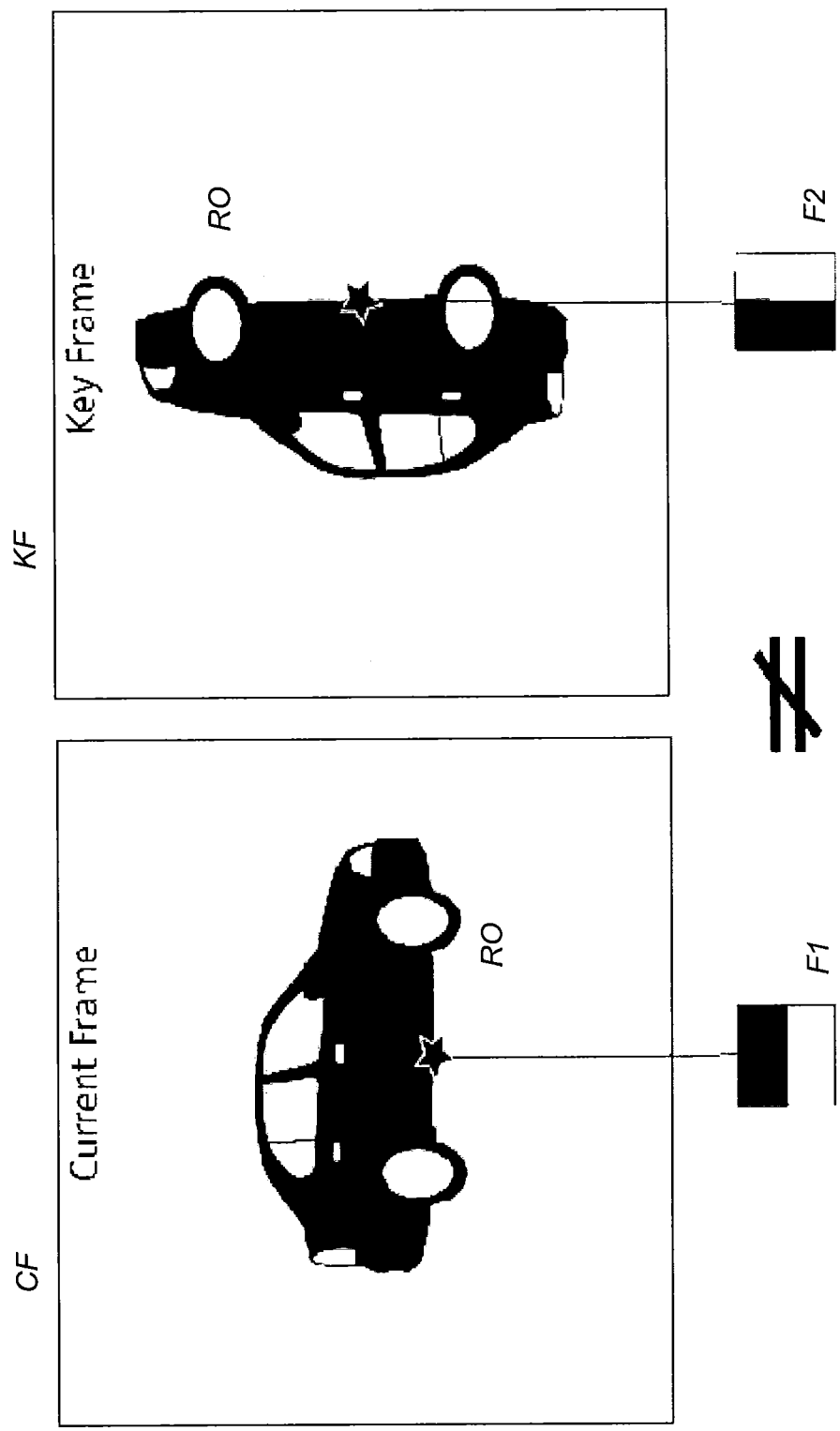
FIGS. 2 and 3 show exemplary images of a real object in connection with the method as described with reference to FIG. 1.
Figure 3:
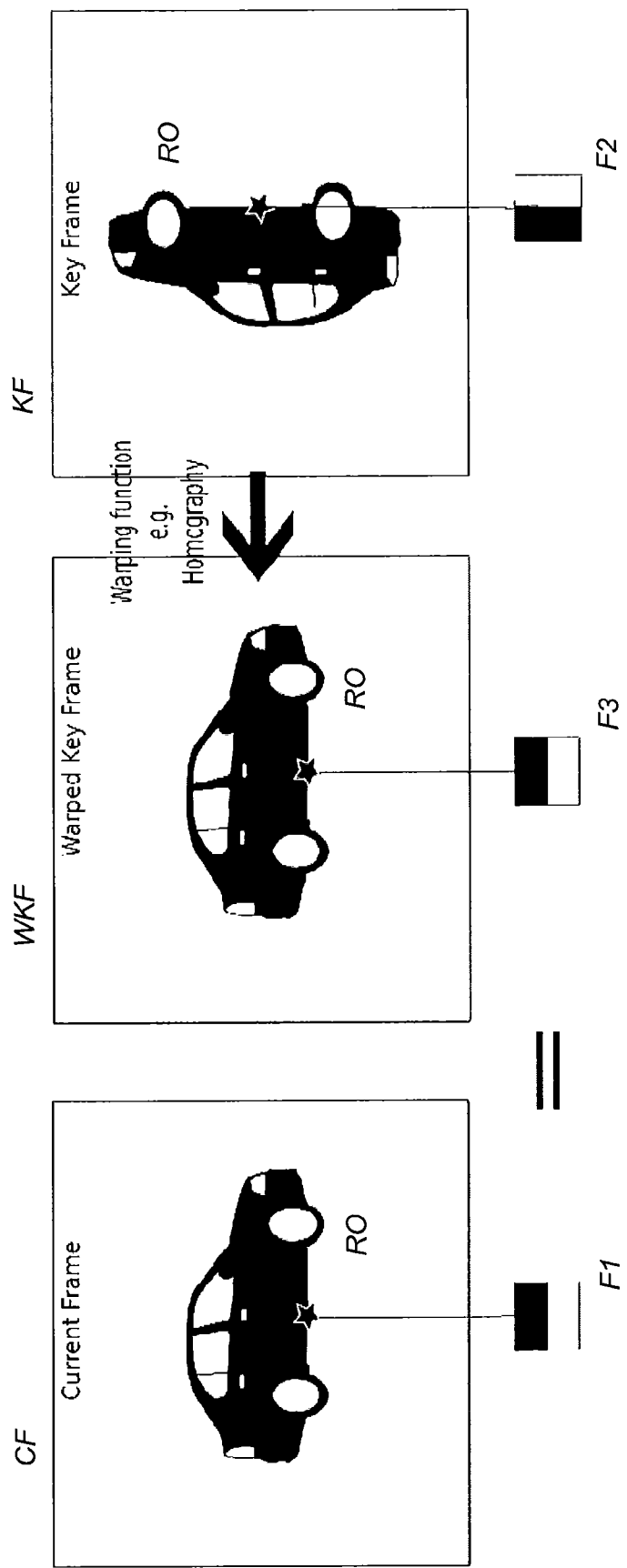

FIGS. 2 and 3 show exemplary images of a real object RO in connection with the method as described with reference to FIG. 1. As can be seen from FIG. 2, a feature extracted in the current image (current frame CF) may be feature F1, which corresponds to feature F2 of the real object RO in the keyframe KF. However, without the refinement method according to the invention, as described above, the displacement may be too big for common matching algorithms, so that the features F1 and F2 may not be found as corresponding to each other. On the other hand, as shown in FIG. 3, with the method according to the invention such as the one as described in FIG. 1b, finding correspondences between the warped keyframe image WKF and the current image CF may be facilitated since the deviation between the corresponding features F3 and F1 is significantly reduced. In this regard, similar results can be achieved if, according to another embodiment, the first image is set to be the current image captured by the camera and the second image is set to be the reference image (e.g., closest keyframe), wherein the current image is subject to warping to reduce deviation between corresponding features of the first and second images.

Although this invention has been shown and described with respect to the detailed embodiments thereof, it will be understood by those skilled in the art that various changes in form and detail may be made without departing from the spirit and scope of the invention.

What is claimed is:

1. A method for determining correspondences between a first and a second image, comprising the steps of:
    a) providing a first image and a second image of a real environment;
    b) defining a warping function between the first and second image;
    c) determining the parameters of the warping function between the first image and the second image by means of an image registration method;
    d) determining a third image by applying the warping function with the determined parameters to the first image;
    e) determining a matching result by matching the third image and the second image; and
    f) determining correspondences between the first and the second image using the matching result and the warping function with the determined parameters.

2. The method according to claim 1, wherein the definition of the warping function is based on an assumption about a geometry of the real environment.

3. The method according to claim 2, wherein the geometry of the real environment is assumed to be planar.

4. The method according to claim 1, wherein the definition of the warping function is based on changes in the real environment between capturing the first image and capturing the second image.

5. The method according to claim 2, wherein the assumption about the geometry of the real environment and/or the changes in the real environment between capturing the first image and the second image are acquired from at least one of an environment model, a three-dimensional reconstruction method, a time-of-flight camera, stereovision and structured-light-based approach.

6. The method according to claim 1, wherein the definition of the warping function is based on an assumed camera motion between capturing the first image and capturing the second image.

7. The method according to claim 1, wherein the definition of the warping function is based on illumination changes in the real environment or in the image between the first image and the second image.

8. The method according to claim 1, wherein the image registration method is selected according to the definition of the warping function.

9. The method according to claim 1, wherein the image registration method is based on an iterative minimization process, wherein a first set of pixels in the first image is compared with a computed set of pixels in the second image and the computed set of pixels in the second image used for the comparison varies at each iteration.

10. The method according to claim 9, wherein the comparison in the image registration method is based on image intensity differences.

11. The method according to claim 9, wherein an initial estimate of the parameters of the warping function is provided to the iterative minimization process.

12. The method according to claim 11, wherein the initial estimate of the parameters of the warping function is determined using an estimate of camera motion between capturing the first image and capturing the second image.

13. The method according to claim 1, wherein step e) is further comprising:
    extracting features from the third image;
    extracting features from the second image; and
    determining the matching result by matching the extracted features from the third and the second image.

14. The method according to claim 13, further comprising:
    providing initial correspondences between the first image and the second image; and
    determining the matching result only for the extracted features that are not present in the initial correspondences.

15. The method according to claim 14, wherein the initial correspondences is determined using an image matching method.

16. The method according to claim 2, wherein the assumption about the geometry of the real environment is acquired from at least one of an environment model, a three-dimensional reconstruction method, a time-of-flight camera, stereovision and structured-light-based approach.

17. The method of claim 1, further comprising:
    a1) providing at least one reference image and a reference pose of a camera in a common coordinate system while capturing the at least one reference image;
    b1) capturing a current image;
    c1) determining correspondences between the current image and the at least one reference image according to steps a-f, wherein the first image is set to be the reference image or the current image, and the second image is set to be the current image or the reference image, respectively; and
    d1) determining a pose of the camera based on the determined correspondences.

18. The method according to claim 17, wherein step b1) is further comprising the step of providing an initial estimate of the current pose of the camera in the common coordinate system while capturing the current image, and in step c1) the current image is matched with at least one reference image selected from a set of reference images, wherein the selection is based on the distance of the reference pose to the estimate of the current pose.

19. The method according to claim 18, wherein the initial estimate of the pose of the camera is acquired by using at least one of an optical tracking method, inertial sensor information and stereo vision.

20. The method according to claim 4, wherein the changes in the real environment between capturing the first image and the second image are acquired from at least one of an environment model, a three-dimensional reconstruction method, a time-of-flight camera, stereovision and structured-light-based approach.

21. The method according to claim 1, wherein step d) comprises
- d1) determining the third image by applying the warping function with the determined parameters to the first image,
- d2) computing a photometric error between the third and the second images,
- d3) if the photometric error is above a threshold,
- d4) update parameters of the warping function according to the photometric error and then go to step d1).

22. A non-transitory computer readable medium comprising software code sections adapted to perform a method for determining correspondences between a first and a second image, comprising the steps of:
- a) providing a first image and a second image of the real environment;
- b) defining a warping function between the first and second image;
- c) determining the parameters of the warping function between the first image and the second image by means of an image registration method;
- d) determining a third image by applying the warping function with the determined parameters to the first image;
- e) determining a matching result by matching the third image and the second image; and
- f) determining correspondences between the first and the second image using the matching result and the warping function with the determined parameters.

* * * * *